(12) United States Patent
Baudard et al.

(10) Patent No.: US 9,493,192 B2
(45) Date of Patent: Nov. 15, 2016

(54) CROSSMEMBER MADE OF A FIBER-REINFORCED COMPOSITE MATERIAL FOR A VEHICLE DASHBOARD AND METHOD FOR MANUFACTURING SAME

(71) Applicant: FAURECIA INTERIEUR INDUSTRIE, Nanterre (FR)

(72) Inventors: Laurent Baudard, Fresnoy en Thelle (FR); Mickael Trannoy, Cauvigny (FR); Jean Michel Appasamy, Jouars Pontchartrain (FR)

(73) Assignees: Faurecia Interieur Industrie, Nanterre (FR); Peugeot Citroën Automobiles SA, Velizy Villacoublay (FR)

( * ) Notice: Subject to any disclaimer, the term of this patent is extended or adjusted under 35 U.S.C. 154(b) by 0 days.

(21) Appl. No.: 14/405,715

(22) PCT Filed: Jun. 3, 2013

(86) PCT No.: PCT/EP2013/061387
§ 371 (c)(1),
(2) Date: Dec. 4, 2014

(87) PCT Pub. No.: WO2013/182521
PCT Pub. Date: Dec. 12, 2013

(65) Prior Publication Data
US 2015/0145275 A1 May 28, 2015

(30) Foreign Application Priority Data
Jun. 7, 2012 (FR) ..................... 12 55342

(51) Int. Cl.
| | |
|---|---|
| B62D 25/14 | (2006.01) |
| B29C 53/04 | (2006.01) |
| B29C 65/00 | (2006.01) |
| B62D 29/04 | (2006.01) |
| B29L 31/30 | (2006.01) |

(52) U.S. Cl.
CPC ............ *B62D 25/145* (2013.01); *B29C 53/04* (2013.01); *B29C 65/00* (2013.01); *B62D 29/043* (2013.01); *B29L 2031/3008* (2013.01); *Y10T 156/1051* (2015.01)

(58) Field of Classification Search
CPC ....... B29C 53/04; B29C 63/04; B62D 25/14; B62D 25/145; B62D 29/04; B62D 29/043
USPC ..................... 296/70, 72, 193.02
See application file for complete search history.

(56) References Cited

U.S. PATENT DOCUMENTS 5,823,602 A * 10/1998 Kelman ............ B60K 37/00
                                                                 180/90
5,934,744 A    8/1999 Jergens et al.
(Continued)

FOREIGN PATENT DOCUMENTS

| | | |
|---|---|---|
| DE | 102010037462 A1 | 3/2012 |
| EP | 2113448 A2 | 11/2009 |

OTHER PUBLICATIONS

International Search Report of corresponding application PCT/EP2013/061387 mailed Jul. 30, 2013.
(Continued)

*Primary Examiner* — Jason S Daniels
(74) *Attorney, Agent, or Firm* — Polster, Lieder, Woodruff & Lucchesi, LC

(57) ABSTRACT

The present invention relates to a dashboard crossmember (1) for a vehicle, including a crossbar (2) as well as at least one connection flange (3) designed to enable said crossbar to be attached to the body of said vehicle, said crossmember being characterized in that said crossbar (2) includes a bearing web (10) made of a fiber-reinforced composite material including continuous libers (7) arranged within a matrix (8), and preferably results from the assembly of a plurality of preformed basic parts (13, 14, 15) each produced by bending a composite material lap piece (11) about a single direction of the space so as to avoid overstretching or dislocating the network of fibers (7) of each of said laps.

17 Claims, 2 Drawing Sheets

(56) References Cited

U.S. PATENT DOCUMENTS

| | | | | |
|---|---|---|---|---|
| 8,474,902 B2* | 7/2013 | Malek | | B62D 25/145 |
| | | | | 296/193.02 |
| 2002/0011047 A1* | 1/2002 | Obeshaw | | B21C 37/15 |
| | | | | 52/794.1 |
| 2002/0071920 A1* | 6/2002 | Obeshaw | | B21C 37/15 |
| | | | | 428/34.1 |
| 2004/0135400 A1* | 7/2004 | Matsuzaki | | B29C 45/14598 |
| | | | | 296/193.02 |

OTHER PUBLICATIONS

Written Opinion of corresponding application PCT/EP2013/061387 mailed Dec. 9, 2014.

* cited by examiner

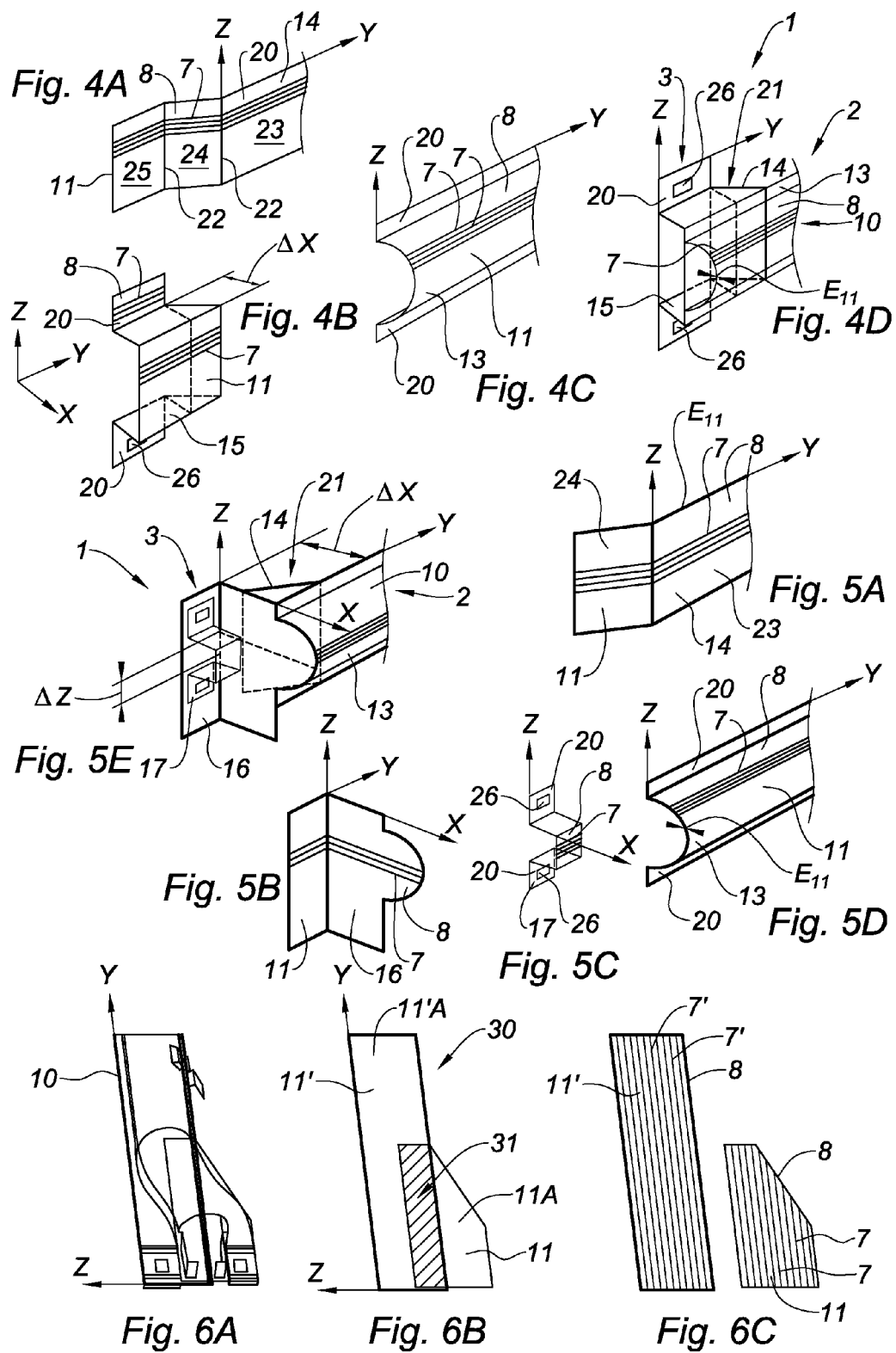

CROSSMEMBER MADE OF A FIBER-REINFORCED COMPOSITE MATERIAL FOR A VEHICLE DASHBOARD AND METHOD FOR MANUFACTURING SAME

CROSS REFERENCE TO RELATED APPLICATIONS

This application is the US National Stage of International Application No. PCT/EP2013/061387, which was filed Jun. 3, 2013 and which claims priority of French application 1255342 filed on Jun. 7, 2012, the content (text, drawings and claims) of which are incorporated here by reference.

BACKGROUND OF THE INVENTION

The present invention relates to the general domain of crossmembers used in vehicle construction, especially automotive vehicles, and more specifically to crossmembers which are mounted to the vehicle body, transversally to the drive direction, to provide means for mounting the dashboard of the vehicle as well as various accessories such as climate control unit, steering column, glove compartment, etc.

It is known that crossmembers generally comprise a crossbar made of steel tubing which extends between two mounting flanges securing the crossbar to the body of the vehicle, and which is usually also supported by a central strut attached to the floor of the vehicle.

Although known crossmembers generally perform satisfactorily, in particular because of their rigidity, they may nevertheless have some drawbacks.

In particular, their fabrication may require heavy, cumbersome and costly equipment, including, for instance, shear presses and welding machines, as well as stamping presses specially equipped with the necessary punches and dies.

In addition, the relatively heavy weight of known crossmembers complicates their manipulation during assembly and contributes to make the vehicle heavy, to the detriment of the vehicle's fuel consumption.

SUMMARY

Consequently, the goal of the invention is to propose a new crossmember for a vehicle dashboard with a structure which is both light in weight and high in mechanical strength as required for the application.

Another goal of the invention is to propose a new fabrication method for dashboard crossmembers which is simple, reproducible, fast and inexpensive.

The goals of the invention are achieved by means of a dashboard crossmember for a vehicle, the crossmember comprising a crossbar and at least one connecting flange designed for mounting the crossbar to the body of the vehicle, the crossmember being characterized in that the crossbar includes a carrier core made of a first fiber-reinforced composite material which extends over most of the length, and by preference over the whole length of, the crossbar, the first composite material comprising continuous fibers, arranged in a matrix, and running without interruption over the whole length of the carrier core.

The goals of the invention are also achieved by means of a fabrication method for a vehicle dashboard crossmember which must include a crossbar and at least one connecting flange for mounting the crossbar to the body of the vehicle, the method being characterized in that it comprises a step a) in which the crossbar is created at least partially by curving or bending a piece of sheet of composite material around one direction of space in order to avoid overstretching or dislocating the fiber network of the sheet.

Advantageously, the invention provides means for producing a crossmember with the main part, the crossbar, made of an especially light composite material, at least over part of its length, and more in particular in the transverse direction of the vehicle on which it is used, which is lighter than steel, but nevertheless very strong because of the presence of appropriately arranged reinforcement fibers.

Advantageously, the method according to the invention is specifically based on employing the composite material and preserving the homogeneity of its structure, and consequently its mechanical properties, without creating specific weak zones in which the matrix is depleted of its fibers by heavy stamping or deep drawing operations.

Furthermore, the invention provides means for producing the crossbar, and, more generally, the crossmember, with simpler tooling, potentially consuming less energy, while using relatively little raw material, and by means of relatively simple and fast operations (shearing, bending and assembly), due in particular to the ease of transforming composite materials, which renders the method especially compatible with the mass production throughput required in the automotive industry, and more specifically with the automation used in the industry.

BRIEF DESCRIPTION OF THE DRAWINGS

Other objectives, characteristics and advantages of the invention will be presented in more detail in the following description, with reference to the attached drawings, provided strictly for illustrative and non-limiting purposes, among which:

FIGS. 4A to 4D are perspective views illustrating a first variant of the crossmember, starting from an assembly of individual pieces made of composite material preformed through bending.

FIGS. 5A to 5E are perspective views of a second variant of the crossmember, starting from an assembly of individual pieces made of composite material preformed through bending.

FIGS. 6A to 6C are perspective views illustrating a variant of the fabrication method of the crossmember.

DETAILED DESCRIPTION

The present invention relates to a dashboard crossmember 1 for a vehicle, the crossmember comprising a crossbar 2 as well as connecting flanges 3, 4 designed for mounting the crossbar to the body of the vehicle (not shown).

The invention relates also to a vehicle (not shown), and in particular an automotive vehicle, equipped with a dashboard crossmember according to the invention.

Figure 1:
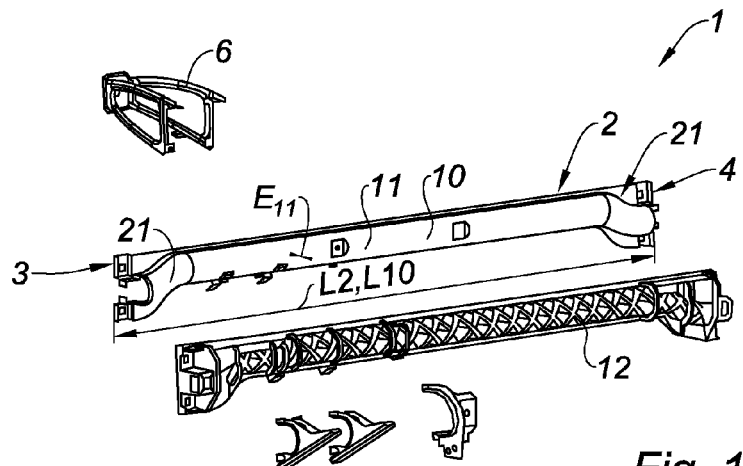
FIG. 1 is an exploded perspective view illustrating an example of a dashboard crossmember.
Figure 2:
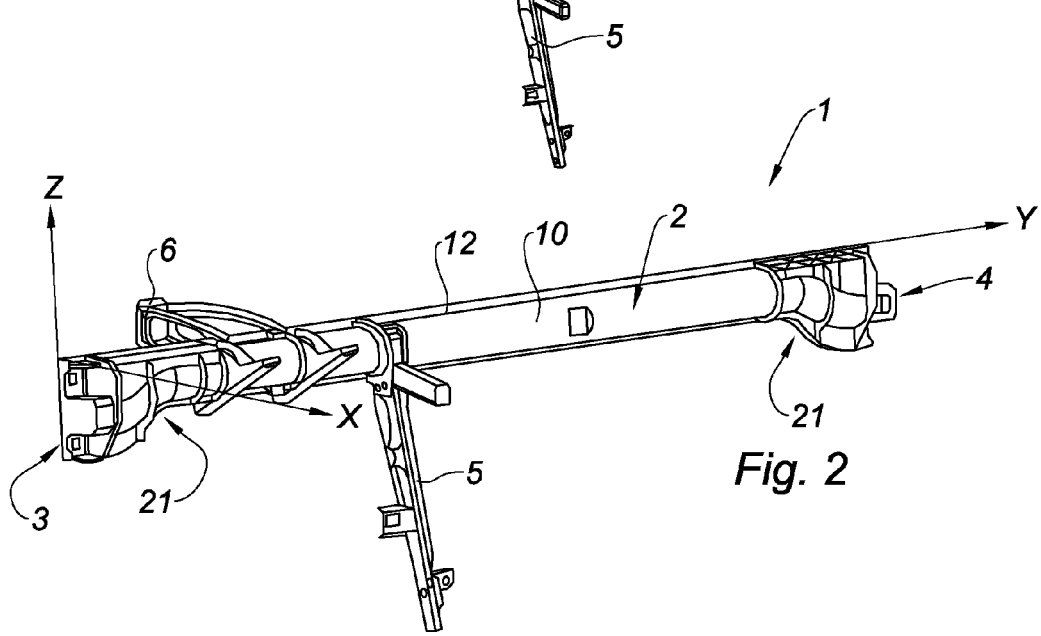
FIG. 2 is a perspective view illustrating the assembled crossmember of FIG. 1.

By preference, as illustrated in FIGS. 1 and 2, crossmember 1 comprises at least two connecting flanges, 3, 4 arranged lengthwise on both sides of the crossbar 2, at the extremities of the the crossbar, so that the flanges can be attached to both sides (left and right) of the vehicle body. Once mounted, the crossmember extends transversally to the drive direction of the vehicle, and approximately over the whole width of the vehicle.

By preference, the crossmember includes a strut 5 anchored to the floor of the vehicle and supporting the crossbar 2 in an intermediate position, at a distance from the two connecting flanges 3, 4 as well as, by preference, a mounting fork 6, which is by preference deformable in case of impacts, and for instance made of steel, connecting the crossmember, and, more particularly, crossbar 2 to a forward portion of the vehicle body, approximately facing the steering column.

By convention, and for ease of description, the horizontal forward/reverse driving direction of the vehicle is designated by "X", the transverse direction of the vehicle, which corresponds in general with the lengthwise extension of the crossmember 1 and more in particular of the crossbar 2, is designated by "Y," and the vertical direction, which forms with the preceding directions a direct trihedral, by "Z".

The crossbar 2 is made partially or completely, and more particularly over at least a portion of its length, and therefore over at least a portion of the width of the vehicle in which it is mounted, of at least fiber-reinforced composite material containing fibers 7, by preference continuous fibers, arranged in a matrix 8.

Fibers 7 can be glass, carbon or aramid fibers, etc.

The matrix is made by preference of polymer material, such as polypropylene or polyamide, and more preferentially of resin type thermoplastic polymer.

The advantage of the composite material is that the crossbar 2, and therefore the crossmember 1 is lighter than a metallic construction, while maintaining, thanks to reinforcement fibers 7, a high elasticity module, great rigidity, and high resistance against traction, bending and buckling under lateral compression stresses or shearing forces.

By preference, the crossbar 2 has a hollow or tubular structure, covered by a relatively thin composite skin, with low density compared to metal, but with good rigidity and toughness.

By preference, the form and dimensions of the crossmember 1, and more in particular of the crossbar 2, will be studied in order to limit vibrations, and in particular the occurrence of resonance in the spectrum of the vibrations generated by the engine or the movement of the vehicle.

By preference, the crossbar 2 comprises a carrier core 10 made of a first fiber-reinforced composite material which extends over most of its length, and by preference over the whole length L2, of the crossbar, and more particularly over at least 50%, 75% or 90% of the length L2.

Advantageously, the carrier core 10 can form a beam type support structure, capable of supporting the crossbar over its length, and in particular of absorbing the compression, traction, torsion or flexion stresses that the latter is subjected to inside the vehicle.

In a particularly preferential manner, the crossbar can be made entirely of one or more fiber-reinforced composite materials, without having a metallic reinforcement structure such as a rod, a beam, a tube or a shell.

In a particularly preferential manner, the composite material of the carrier core 10 contains continuous fibers 7, each extending uninterrupted over the whole length occupied by the fiber-reinforced composite material, and more particularly over the whole length L10 of the carrier core, and therefore, for instance, by preference over the whole length of the crossbar 2.

Advantageously, the use of continuous fibers, advantageously arranged parallel to each other and by preference straight and parallel to the generating line of the carrier core 10, forming in this way a regular network of warp yarn inside the first composite material, as partially illustrated in FIGS. 4A-5E, results in a particularly effective lengthwise reinforcement of crossbar 2, which is free of weak zones, because each fiber is made of a single wire from one end to the other of core 10, and in general if necessary of crossbar 2, covering in the manner of a tension rod the whole portion that is effectively subjected to stresses.

Obviously, it can also be envisaged that the first composite material constituting core 10 comprises also "weft" fibers 7 arranged across the lengthwise "warp" fibers 7, and by preference perpendicular to the latter.

If necessary, the fibers 7 can also form a woven or non-woven textile type crossed network.

Although numerous fiber arrangements can be envisaged, by varying the relative disposition and orientation of the fibers 7, a fiber network can be implemented comprising approximately 90% lengthwise fibers at 0° (according to X, considering a flat development), and 10% transverse fibers at 90° degrees (according to Z, considering a flat development).

By preference, the distribution of the continuous lengthwise fibers, considered within the width of the crossbar 2 at the orientation of the fibers, will be regular and homogenous over the whole width of the crossbar 2, if necessary both in sheet 11 used to make the part prior to its forming as well as on the finished part obtained by setting the volume of the sheet 11, and this in order to ensure high strength and homogeneous behavior in all points of the crossbar 2.

By preference, the carrier core 10 is made over most of its length L10, and by preference over the whole length L10, of one continuous composite sheet 11 of the same thickness E11.

The sheet 11 will have by preference continuous fibers 7, which extend at least lengthwise or transversally of the sheet.

Advantageously, a homogenous and particularly thin structure of core 10 can be obtained due to the fact that a single enveloping layer of composite, preferentially with continuous fibers, is in practice sufficient to give core 10, and by extension crossbar 2, specifically in the central portion of the latter, the necessary strength and self-supporting characteristics.

Although it is not excluded that sheet 11 can be superimposed locally, in particular to connect the individual pieces 13, 14, 15, 16, 17 to each other such as illustrated in FIGS. 4D and 5E, the overlap of sheets 11 will cover by preference only a small part of the surface of each sheet 11 placed in contact in this manner, since the unitary thickness E11 and the composition of each sheet are chosen so as to intrinsically confer to it the required mechanical properties.

In a particularly preferential mode, crossbar 2 will in general not comprise more than three, and by preference never more than two, layers of sheet 11 overlapping each other in thickness when in contact with each other.

This simplified structure which eliminates the need for a multilayer arrangement containing a multitude of distinct superimposed sheets, not only preserves the light weight of the crossmember 1, but reduces also the consumption of raw material needed for its fabrication, and reduces the cycle time required to create each piece, and more particularly the carrier core 10, because it is sufficient to form each time, directly and in a single pass, one existing single layer of sheet 11, by preference containing continuous fibers, and simply precut to the desired dimensions.

By preference, as illustrated in FIGS. 1 and 2, the carrier core 10, and more generally the crossbar 2, is coated, over its whole length or part thereof, on at least one of its faces, with a non-metallic reinforcement layer 12, made by preference by over-molding, in a second material, different from the first composite material constituting the carrier core 10.

The over-molded reinforcement layer 12 can be made, for instance, of a polymer material, such as polypropylene or polyamide, if necessary reinforced with short non-continuous fibers, with a length of 10 mm to 25 mm, or even ultra-short fibers measuring between 2 mm and 4 mm.

Advantageously, such material is in fact suitable for injection over-molding on the carrier core 10, which forms the true functional armature of the crossbar 2.

Such a coating layer can be used to add to crossmember 1, and more particularly to crossbar 2, elements providing additional functions which do not contribute, or only marginally contribute, to the structural strength of crossbar 2, such as for instance leg or eyelet mounting interfaces, used to mount crossmember accessories such as climate control group, radio, glove compartment, etc.

Advantageously, all or some of the interface surfaces, until now made of metal, can be replaced by elements made of (the second) composite material, in order to make the crossmember even lighter.

The crossmember 1 can therefore have a dual layered structure, differentiated in its composition and function, comprising a first layer of carrier armature formed by core 10, by preference by means of at least one sheet 11 with continuous long fibers, and a second reinforcement layer 12 providing for instance additional mounting interfaces, by preference created by over-molding with a short fiber composite.

By preference, where the connecting flanges 3, 4 are made of a fiber containing composite material, the material can be identical or different from the material of core 10.

Advantageously, even the connection points at the extremities of crossbar 2 can be made of composite material, rather than massive metal alloy, so that the structure of crossmember 1 is comprised over its whole length of a solidly connected sub-assembly made mostly if not totally of composite material.

More generally, according to a preferential characteristic which can constitute an invention by itself, as illustrated in FIGS. 4A-5E, crossmember 1 comprises an assembly of preformed individual composite parts 13, 14, 15, 16, 17 of different form and made separately from a specific patch of fiber-reinforced composite material.

The individual parts 13, 14, 15, 16, 17 can have different fiber densities and/or orientations.

By preference, the individual parts are formed each from a single sheet 11, style patch, comprising by preference continuous fibers 7 which run uninterrupted from one cut edge of the patch to the opposite cut edge, giving increased strength to the individual parts, as explained above.

By preference, the individual parts are assembled so that the direction of the continuous fibers of the patch comprising one of the parts is parallel to the direction of the continuous fibers of the patch constituting the adjacent part.

Advantageously, this structure gives to the individual parts, and therefore to the assembly they form once regrouped, the ability to maintain collectively a relatively high strength, notwithstanding the interruptions of the patches.

The assembly of individual parts 13, 14, 15, 16, 17, preferably in direct contact with each other, can be created through any suitable process, and specifically by welding, for instance hot welding, ultrasonic welding or laser welding, by gluing, for instance with epoxy or by means of a structural glue such as polyurethane, even by interlace stitching of fibers of one patch 11 with the fibers of the adjacent patch, in case of need through the intermediary of added suturing fibers stitched for this purpose through the patches.

By preference, at least some individual parts will have flat mounting surfaces 20, in the style of peripheral flaps, which provide a good mounting surface on the adjacent individual part.

Assembly can of course be facilitated by the fact that the preformed and rigid individual parts 13, 14, 15, 16, 17, which are easy to handle, can have two by two conjugated forms, produced by cutting or bending, simplifying their juxtaposition, superimposition, or encasement.

Advantageously, the breakdown of some parts of the crossmember 1, and specifically of the extremities forming the mounting flanges 3, 4, in several individual pieces 13, 14, 15, 16, 17 of relatively simple form makes it possible to create particularly complex general forms, if necessary non-developable forms, which may be necessary because of the arrangement of the vehicle and therefore of the environment in which the crossmember 1 is to be integrated, or by the vibrational properties required of the crossmember.

The working volume of crossmember 1 can indeed be created according to a first direction in space (for instance X) by a first individual part (for instance part 14), and according to a second direction (for instance Z) by a second part (for instance part 16) which comes in contact with the first, advantageously reinforcing the assembly.

Figures 3A, 3B, 3C:
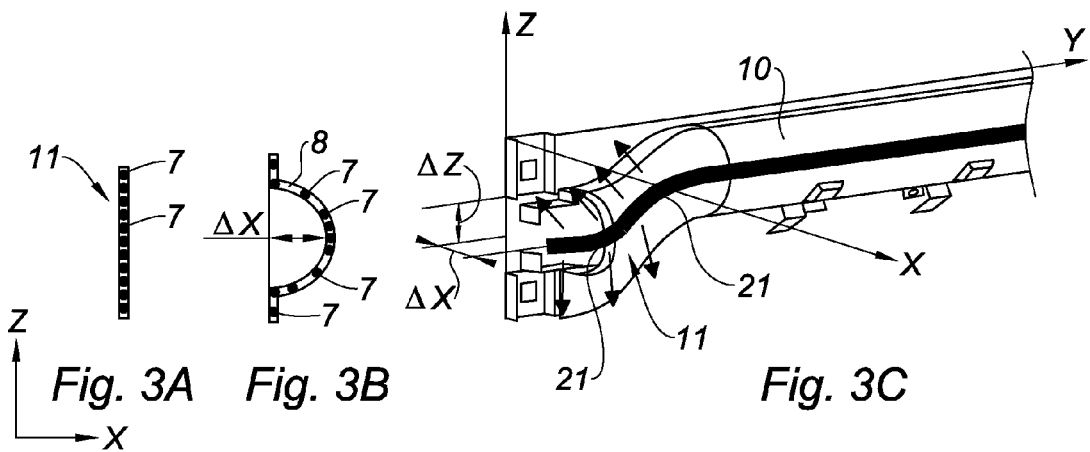
FIGS. 3A, 3B and 3C illustrate the problem of overstretching the composite sheet observed during stamping of a complex form, a problem which is resolved with the method according to the invention.

Advantageously, the breakdown in individual parts makes it possible to accommodate deviations $\Delta X$, $\Delta Z$ of the generating line of crossmember 1, and more in particular of the crossbar 2, according to one or more, and if necessary conjugated, directions of space, and more particularly of the directions perpendicular to the main direction (Y) of lengthwise extension of the crossbar 2, forming in this way a non-straight crossmember (or crossbar) having one or more elbows 21, without making the structure of the composite material fragile by overstretching the matrix or by a risky modification of the fiber distribution, such as illustrated in FIGS. 3A, 3B, and 3C to facilitate the comprehension of these phenomena.

In addition, individual parts 13, 14, 15, 16, 17 can be created by simple bending or folding of the initially flat sheets 11, corresponding with developed parts of relatively simple contours, in this way simplifying the fabrication of the parts, and limiting the clippings, saving raw material, but also fabricating the raw material without degrading its properties, and in particular preserving the regular distribution and length of fibers 7, especially of long fibers.

Bending and folding can occur for instance by placing the sheet on an appropriate complementary form, or by "soft" forming the sheet, without overstretching, according to a developable surface, between a male and a female mold.

More generally, considered individually, each individual part 13, 14, 15, 16, 17, corresponds by preference with a developable surface, even if their assembly creates by preference a general part of non-developable form, and in particular having one or more elbow 21 type transversal deviations.

According to a first variant of implementation mode corresponding with the example illustrated in FIGS. 4A-4D, a dome 13 (FIG. 4C), for instance made by bending a rectangular patch, if necessary completed by folding in order to obtain a U or Ω shaped half cylinder, can be assembled (FIG. 4D) on a sole 14 (FIG. 4A), here having two folding lines 22 forming a ramp in the "Z" direction with three successive secant planes 23, 24, 25, whereby the dome 13 is preferably glued by means of its flaps 20 on the first plane 23, so that the assembly of the dome 13 and the sole 14 extends in the Y-direction in the form of a tunnel forming the central portion of the crossbar 2, and more particularly of the carrier core 10, which connects with the second opposite mounting flange 4.

More generally, no matter which implementation variant is envisaged, the crossmember and more particularly the crossbar 2 and especially the carrier core 10 and/or the mounting flanges 3, 4 can be formed advantageously by at least one individual part 13, and by preference by assembling several individual parts 13, 14, 15, 16, 17 made of fiber-reinforced composite material each having an open developable form compatible with their fabrication by bending and/or folding.

For this reason, by defining individual parts, which even when completed, but if necessary before their assembly with other individual parts, have a residual opening, and therefore do not wrap around or fold back on themselves, so that their contour around the generating axis is not totally closed, access is maintained advantageously for inserting and retracting the bending/folding tool, which facilitates the fabrication of the individual parts, eventually in a single pass, resulting therefore in productivity gains.

In particular, if the first composite material comprises at least a pattern of continuous fibers 7 parallel to each other, preferably parallel to the Y direction of lengthwise extension of the crossbar 2, and if necessary constituting the majority if not the total pattern of the sheet 11, one of the individual parts 13, 15, 17 can have by preference one or more arcs and/or folds 22 with the bending or folding axis in line with the fibers 7.

Advantageously, such disposition maintains the integrity of the material, and especially preserves the regular disposition of fibers, in particular around the bending/folding axis, while providing a part which is both rigid, because of the created volume, transversally to the fibers, by the folds and/or arcs, and lengthwise resistant to traction, in the direction of the fibers 7.

On the other hand, it can be envisioned bending or folding sheet 11 according to a bending/folding axis perpendicular to the long lengthwise fibers, this can be the case for sole 14 (FIG. 4A).

An elbow 21 can be formed at the extremity of the crossmember, here with an offset ΔX, due to the inclined plane 24 of the sole 14, integrating the mounting flange 3, by inserting between on the one hand, the extremity of dome 13 and on the other hand inclined plane 24 and lower plane 25 of sole 14, a shoulder 15 (FIG. 4B), here in the form of a beveled parallelepiped, in which advantageously mounting holes 26 can be made in the flaps 20, and advantageously having a conjugated inclined plane to the inclined plane 24 against which it is mounted.

Each of these three individual parts 13, 14, 15 can also constitute one or more faces of a box of complex form, meeting the geometric, dimensional and functional specifications of the mounting flange 3 and of crossbar 2.

According to a second variant embodiment illustrated in FIGS. 5A-5E, in a similar manner a dome 13 (FIG. 5D) can be assembled (FIG. 5E) on a sole 14 (FIG. 5A), and flange 3 can have the form of a cheek comprising at least one angle plate 16 (FIG. 5B) of which the cut line of one of its branches corresponds by preference with the transverse section delimited by dome 13, as well as a clip 17 (FIG. 5C), which is for instance rectangular in shape, and placed by preference in the hollow of angle plate 16 to back up the branches, and comprising mounting holes 26 (FIG. 5E).

In this way, a double elbow can be made, and a double offset ΔX, ΔZ, respectively by the inclination in depth of plane 24 of sole 14 and by vertically offsetting the cut line of the angle plate 16 covering the dome 13 relative to the vertically median plane of the angle plate and/or relative to the vertical location of the mounting clip 17.

It is understood that both extremities of the crossmember 1 can be constructed in the same manner.

Of course, a person skilled in the art will be able to adapt the invention to his needs by isolating or combining all or part of the above mentioned characteristics.

The invention also relates to a method for fabricating a dashboard crossmember 1 for a vehicle, which must be provided with a crossbar 2 and at least one mounting flange 3, 4 designed for mounting the crossbar to the body of the vehicle.

According to the invention, the method comprises a step a) in which the crossbar 2 is formed. In this step the crossbar is made at least partially by curving or folding a piece of a sheet 11 (patch) of composite material around a single direction of space in order to avoid overstretching or dislocating the pattern of fibers 7 in the sheet.

Advantageously, this method maintains the structural integrity of the composite sheet 11 during the controlled form modification of the sheet, while avoiding that this forming process, by bending and or folding, is causing tearing or brittleness by depleting matrix 8 of fibers 7, or by plastic elongation, or by displacing fibers 7.

The parts obtained are therefore particularly homogenous and robust, since the distribution of fibers 7 inside matrix 8 is preserved and guaranteed in reproducible manner.

Advantageously, bending, and if necessary folding, are steps which by preference are carried out hot (taking into account the vitreous transition temperature of matrix 8). From a dimensional point of view of the developed sheet, they remain neutral transformations, since fibers 7 spontaneously align themselves according to the path of the neutral fiber running through the sheet 11.

Of course, it can be envisaged forming several arcs by bending, and/or several folds 22 by more pronounced folding, whereby the arcs and/or folds by preference run in parallel directions in the same sheet 11.

As an example, in an initially flat rectangular patch, two folds 22 can be made in the Z direction to form sole 14 (FIG. 4A), or an arc with large curvature revolving around the Y direction to form dome 13 (FIG. 4C).

Furthermore, such bending and/or folding operations (and cutting, before or after) are simple transformations, which can be carried out under low stress and/or temperature conditions, therefore the tooling can be simplified, made less massive, and less expensive than the tooling employed for fabricating, and in particular for stamping metal.

As detailed above, the method comprises by preference a step (b) in which the individual parts are formed. In this step several distinct and rigid individual parts 13, 14, 15, 16, 17 are made, by preparing several pieces of sheet 11 of composite material, by preference reinforced with continuous fiber, then by giving each part a predetermined form, followed by a construction step (c) in which the preformed individual parts 13, 14, 15, 16, 17 are assembled on the crossbar 2 in order to reconstitute one or more mounting flanges 3, 4 in one or both extremities of the crossbar 2.

It is understood that if necessary all or a number of individual parts can be employed to form the crossbar 2 and/or to integrate the flange(s) in the bar.

Of course, each individual part can be formed preferably by curving or folding its patch (11) around a single direction of space, if necessary with several parallel folds 22, so as to avoid overstretching or dislocating the fiber 7 network of the sheet 11.

It is to be noted that because of the simplicity of the method, the cycle time for forming a crossmember 1 starting from parts formed from unique single layer sheets, can be reduced to a few minutes, even between 1 and 2 minutes, which is perfectly compatible with the production rates imposed by the automotive industry.

According to a variant method which can constitute an invention by itself, prior to the step of bending or folding, or stamping, a patchwork 30 (FIG. 6B) can be created grouping at least two sheets 11, 11' cut separately (FIG. 6C), which advantageously are superimposed so as to overlap each other in the location of a common portion 31, with a surface smaller than their respective surfaces, the common portion corresponds with the zone of maximum anticipated deformation, as indicated by the superimposition of the views of FIG. 6A.

Although the bending, folding or stamping operations tend to cause some overstretching of patchwork 30, this can be compensated, at least in the common portion 31 which undergoes the largest deformation, by advantageous migration and redistribution of the fibers 7 of the first sheet 11 relative to the fibers 7' of the second sheet 11', for instance by compressing/pushing one sheet into the other or by relative sliding of one sheet relative to the other, so that the finished part has a relatively homogeneous distribution of fibers 7, 7', and at least there is no depletion over a linear distance of matrix 8, 8' predefined as representing an acceptable strength threshold.

Because of the redistribution of the initial over-density of fibers 7, 7' in the common portion 31, the final density (specifically the linear density) in this zone is close to the density of the adjacent single layer portions 11A, 11'A of the rest of patchwork 30.

Of course, the sheets 11, 11' can have continuous fibers 7, 7', and by preference can be superimposed in such manner that their respective continuous fibers are aligned, from one sheet to another, and parallel to each other. On the other hand, the patches can be disposed in such way that their respective continuous fibers cross at a chosen angle (for instance 30 and 45 degrees).

If needed, the sheets 11, 11' can be made of the same composite, or of composites of matrix 8, 8' nature, or of composites of fibers 7, 7' nature, or of composites with different orientation or density of fibers 7, 7'.

The invention claimed is:

1. A dashboard crossmember for a vehicle having a body, said crossmember comprising a crossbar independent of said body and at least one mounting flange designed for mounting said crossbar to the body of said vehicle; said crossbar defining an open channel having a substantially constant shape along its length; said crossbar comprising a carrier core made substantially of a first material, said first material being a reinforced fiber composite material which extends over most of the length, of said crossbar, said composite material comprising fibers disposed in a matrix of a thermoplastic polymer, the fibers defining a fiber network comprised of lengthwise fibers and transverse fibers, said lengthwise fibers being continuous fibers extending in an uninterrupted manner over the whole length (L10) of said carrier core; said lengthwise fibers being distributed regularly and homogeneously over the width of said crossbar.

2. The crossmember according to claim 1 wherein the carrier core is formed from at least one individual part, said at least one individual part being made of fiber-reinforced composite material and having a developable open form compatible with their fabrication method by bending and/or folding.

3. The crossmember according to claim 2 wherein each of said one or more of the individual parts have one or more arcs and/or folds for which an axis of bending or folding is aligned with said continuous fibers.

4. The dashboard crossmember of claim 3 wherein the continuous fibers run parallel to a lengthwise direction (Y) of extension of the crossbar.

5. The dashboard crossmember of claim 2 wherein the carrier core is formed from an assembly of several individual parts.

6. The crossmember according to claim 1 wherein the carrier core is made over most of its length (L10) from a sheet of continuous composite material of uniform thickness.

7. The dashboard crossmember of claim 6 wherein the carrier core is made over its whole length from a sheet of continuous composite of uniform thickness.

8. The crossmember according to claim 1 wherein the carrier core is coated with a non-metallic reinforcement layer comprised of a second material which is different from the first composite material of said carrier core.

9. The dashboard crossmember of claim 8 wherein said reinforcement layer is formed by over molding.

10. The crossmember according to claim 8 wherein said second material comprises non-continuous reinforcement fibers.

11. The crossmember according to claim 1 wherein the at least one mounting flange(s) is made of a fiber-reinforced composite material.

12. The crossmember according to claim 1 wherein said crossmember comprises an assembly of individual composite parts of different forms, wherein each of said forms are created separately from said first material.

13. A vehicle equipped with the dashboard crossmember according to claim 1.

14. The dashboard crossmember of claim 1 wherein said carrier core extends over the whole length of said crossbar.

15. The dashboard crossmember of claim 1 wherein said fiber network is about 90% lengthwise fibers extending a 0° relative to an X-direction and about 10% crosswise fibers extending at 90° relative to a Z-direction.

16. A method for fabricating a dashboard crossmember of a vehicle having a body which must be equipped with a crossbar and at least one connecting flange designed for mounting said crossbar to the body of the vehicle, said method comprising a step (a) of forming said crossbar to have an open, developable form which defines an open channel having a substantially constant shape along its length by at least partially by curving or folding a piece of sheet of composite material around a single direction of space so as to avoid overstretching or dislocating a fiber pattern of said sheet; said crossbar being from a composite material comprising lengthwise fibers disposed in a matrix of a thermoplastic polymer which extend in an uninterrupted manner over the length of a carrier core of said crossmember; and wherein the lengthwise fibers are distributed regularly and homogeneously over the width of said crossbar after said forming step is complete.

17. The method according to claim 16 wherein the method further comprises a step (b) in which several distinct and rigid individual parts are made separately by preparing several pieces from composite material sheet, then by giving each of the different parts a predetermined open, developable form, followed by a construction step (c) in which said preformed individual parts are assembled on the crossbar in order to reconstitute said at least one mounting flange on one or both extremities of said bar.

* * * * *